United States Patent
Van Rosendale

(10) Patent No.: US 9,915,035 B1
(45) Date of Patent: Mar. 13, 2018

(54) BIDIRECTIONAL RAILROAD TRACK TO MAGLEV GUIDEWAY TRANSITION SYSTEM

(71) Applicant: John Van Rosendale, Poquoson, VA (US)

(72) Inventor: John Van Rosendale, Poquoson, VA (US)

(*) Notice: Subject to any disclaimer, the term of this patent is extended or adjusted under 35 U.S.C. 154(b) by 0 days.

(21) Appl. No.: 15/263,573

(22) Filed: Sep. 13, 2016

(51) Int. Cl.
*E01B 25/30* (2006.01)

(52) U.S. Cl.
CPC .................................. *E01B 25/305* (2013.01)

(58) Field of Classification Search
CPC ........ E01B 25/30; E01B 25/305; E01B 25/32; E01B 25/34
See application file for complete search history.

(56) References Cited

U.S. PATENT DOCUMENTS

| | | | | |
|---|---|---|---|---|
| 3,233,559 A | * | 2/1966 | Smith ....................... | B60V 3/04 104/23.2 |
| 3,934,183 A | * | 1/1976 | Saufferer ............. | H02K 41/025 104/243 |
| 4,092,554 A | * | 5/1978 | Quinn ....................... | B60L 7/10 104/292 |
| 5,314,115 A | * | 5/1994 | Moucessian ............. | E01B 3/00 238/106 |
| 5,953,996 A | * | 9/1999 | Powell .................... | B60L 13/04 104/281 |
| 6,085,663 A | | 7/2000 | Powell et al. | |
| 8,468,949 B2 | * | 6/2013 | Kwon ..................... | B61B 13/08 104/155 |
| 2004/0250724 A1 | * | 12/2004 | Sobolewski .............. | B60F 1/02 105/215.1 |
| 2006/0162609 A1 | * | 7/2006 | Weaver .................... | E01B 25/08 104/124 |
| 2007/0289477 A1 | * | 12/2007 | Sobolewski ............ | B60F 1/005 105/215.2 |
| 2010/0211238 A1 | * | 8/2010 | David, Jr. ................. | B60L 5/04 701/20 |
| 2011/0259236 A1 | * | 10/2011 | Kwon ..................... | B60L 13/03 104/138.1 |

* cited by examiner

*Primary Examiner* — Jason C Smith
(74) *Attorney, Agent, or Firm* — Peter J. Van Bergen

(57) ABSTRACT

A bi-directional railroad-track to maglev-guideway transition system includes a portion of a railroad track having two parallel rails defining a first axis of travel, and a portion of a maglev guideway defining a second axis of travel. In the transition system, the portion of the maglev guideway is adjacent to the two parallel rails of the portion of the railroad track with a non-zero elevation grade being defined between the first axis of travel and the second axis of travel.

12 Claims, 10 Drawing Sheets

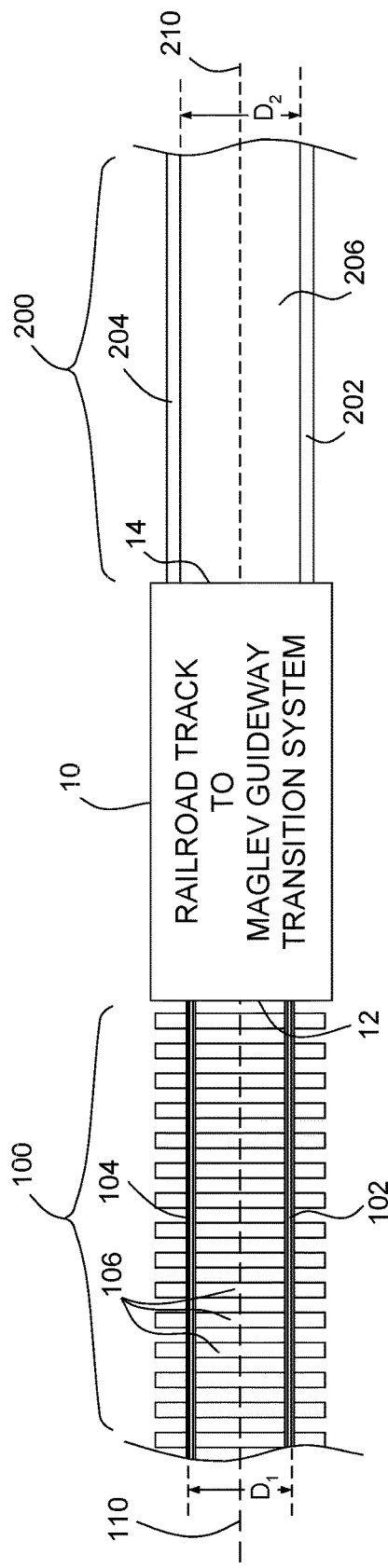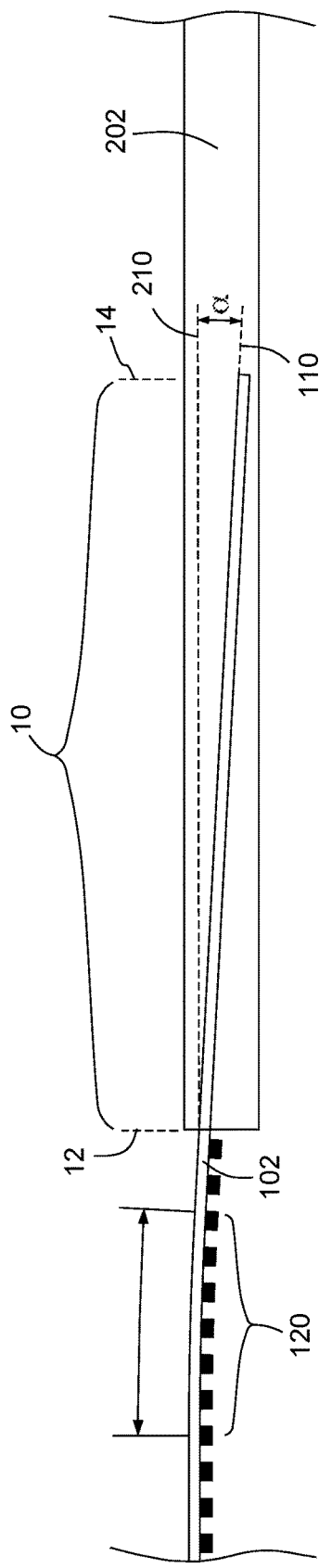
FIG. 1
FIG. 2

US 9,915,035 B1

BIDIRECTIONAL RAILROAD TRACK TO MAGLEV GUIDEWAY TRANSITION SYSTEM

FIELD OF THE INVENTION

The invention relates generally to the interoperability between conventional railroad and maglev transportation systems, and more particularly to a transition system that provides for bi-directional travel by a bimodal vehicle between a conventional railroad track and a maglev guideway.

BACKGROUND OF THE INVENTION

Magnetic levitation (or "maglev" as it is known) is a method of transport that moves vehicles in magnetic suspension along a guideway. Maglev can be faster, quieter, and more efficient than conventional railroad. Moreover, maglev eliminates the wear and vibration from the steel-on-steel contact of conventional railroads thereby greatly reducing right-of-way maintenance.

The infrastructure needed for maglev is completely different than current railroad track infrastructure. That is, maglev vehicles cannot operate on conventional railroad tracks nor can conventional rail vehicles operate on maglev guideways. This incompatibility greatly impedes introduction of maglev since it implies the need for completely new infrastructure. This issue is especially challenging in urban areas where obtaining new right-of-way is difficult and expensive.

One approach to the incompatibility problem is to add maglev guideways to conventional railroad tracks. For example, U.S. Pat. Nos. 5,953,996 and 6,085,663 disclose the additional mounting of maglev guideway components on the ends of a conventional railroad track's ties. With this modification, conventional railroad vehicles can still use the railroad track, while maglev vehicles can straddle the conventional railroad track and operate on the surrounding maglev guideway rails. The disclosed approach allows maglev and conventional rail vehicles to share the same right-of-way. However, addition of the maglev guideway components to the conventional railroad track complicates routine track maintenance and adds cost and complexity to the entire rail line.

SUMMARY OF THE INVENTION

Accordingly, it is an object of the present invention to provide for interoperability between a conventional railroad track and a maglev guideway.

Another object of the present invention is to provide a transition system that supports bi-directional travel of a bimodal railway-maglev vehicle between a conventional railroad track and a maglev guideway.

Still another object of the present invention is to provide a transition system that serves as an interoperability link between a convention railroad track and a maglev guideway.

Other objects and advantages of the present invention will become more obvious hereinafter in the specification and drawings.

In accordance with the present invention, a bi-directional railroad-track to maglev-guideway transition system is provided. The system includes a portion of a railroad track having two parallel rails defining a first axis of travel, and a portion of a maglev guideway defining a second axis of travel. In the transition system, the portion of the maglev guideway is adjacent to the two parallel rails of the portion of the railroad track. A non-zero elevation grade is defined between the first axis of travel and the second axis of travel.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a schematic view of a bi-directional railroad-track to maglev-guideway transition system in accordance with the present invention;

FIG. 2 is a side schematic view of an embodiment of the transition system illustrating the non-zero elevation grade between a railroad track and a maglev guideway;

DETAILED DESCRIPTION OF THE INVENTION

Figure 3:
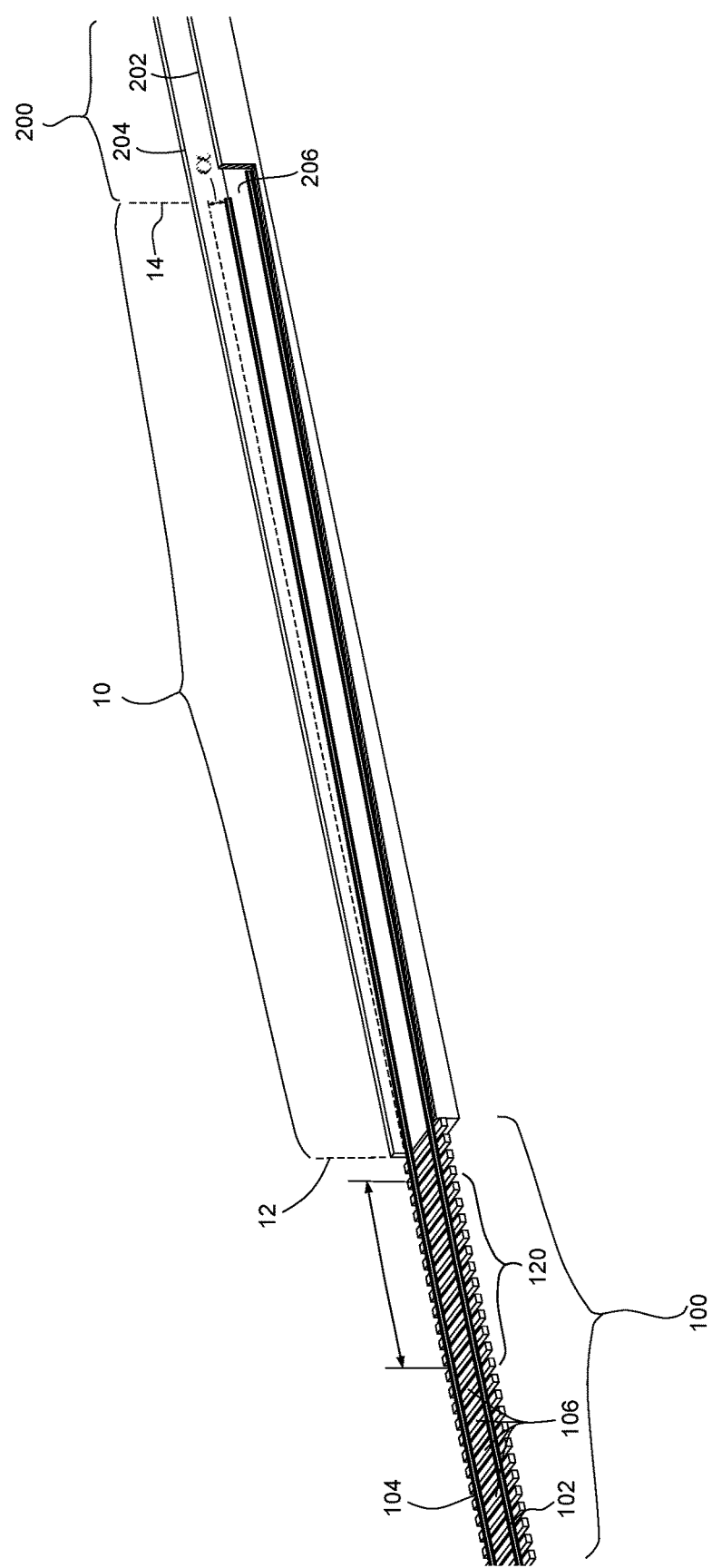
FIG. 3 is a perspective view of a railroad-track to maglev-guideway transition system whose conventional railroad track is supported in a base of a two-rail maglev guideway in accordance with an embodiment of the present invention.
Figure 4:
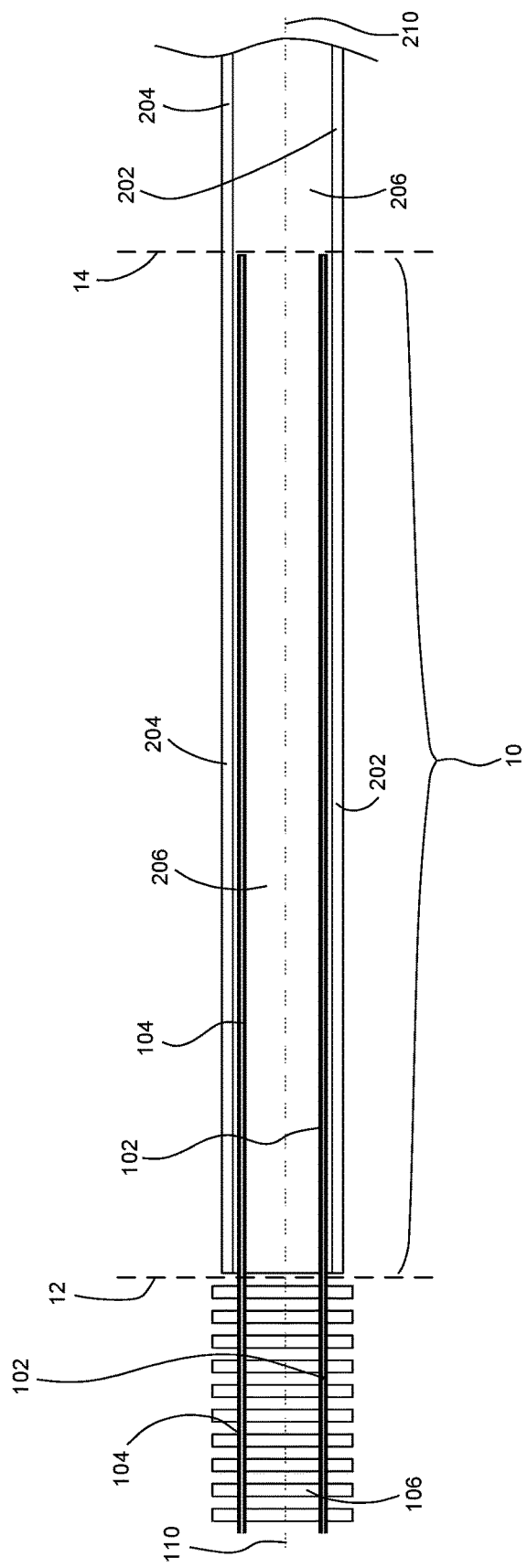
FIG. 4 is a plan view of the railroad-track to maglev-guideway transition system illustrated in FIG. 3.

Referring now to the drawings, simultaneous reference will be made to FIGS. 1-4 where several views of a bi-directional railroad-track to maglev-guideway transition system in accordance with an embodiment of the present invention are shown and are referenced by numeral 10. Transition system 10 is an interoperability link between a conventional (i.e., unmodified) railroad track 100 and a maglev guideway 200. That is, transition system 10 provides the structure for a bimodal vehicle (not shown) to seamlessly travel bi-directionally between railroad track 100 and maglev guideway 200. As will be explained further below, such a bimodal vehicle will have one or more bimodal "bogies" capable of supporting a vehicle body for travel along railroad track 100, maglev guideway 200, and transition system 10.

As is well-known in the art, railroad track 100 has two parallel rails 102 and 104 supported on ties 106. The outer edges of rails 102 and 104 are separated by a distance $D_1$, the exact value of which is not a limitation of the present invention. Maglev guideway 200 can be constructed in a variety of ways without departing from the scope of the present invention. By way of an illustrative example, maglev guideway 200 includes two parallel guideway housings 202 and 204 supported on a base 206. In FIG. 3, guideway housing 202 is partially cut away to more clearly illustrate the features of transition system 10. Each of guideway housings 202 and 204 has magnetic levitation and propulsion components (not shown) contained therein. Guideway housings 202 and 204 are separated by a distance $D_2$ that, for purposes of the present invention, is greater than the distance $D_1$ between the outside of railroad track rails 102 and 104. Maglev guideway 200 can be constructed in accordance with the teachings disclosed in U.S. application Ser. No. 15/161,312, the entire contents of which are hereby incorporated by reference.

Transition system 10 includes contiguous extensions from both railroad track 100 and maglev guideway 200. In general, railroad track 100 contiguously enters transition system 10 at one end 12 and terminates at the other end 14 of system 10. Maglev guideway 200 contiguously enters transition system 10 at end 14 and terminates at end 12. Rails 102/104 define an axis of travel 110 for a vehicle traveling there along. Guideway housings 202/204 define an axis of travel 210 for a vehicle traveling there along. Axes of travel 110 and 210 are generally aligned to define a straight-line direction of travel. Between ends 12 and 14 of transition system 10, guideway housing 202 is adjacent and parallel to rail 102, while guideway housing 204 is adjacent and parallel to rail 104. Between ends 12 and 14 of transition system 10, guideway housing 202 is adjacent and parallel, as viewed from above (FIG. 4), to rail 102, while guideway housing 204 is adjacent and parallel, as viewed from above (FIG. 4), to rail 104. Guideway housings 202/204 are on the outside of rails 102/104.

Further and in accordance with the present invention, a non-zero elevation angle α is defined between axis of travel 110 and axis of travel 210 between ends 12 and 14 of transition system 10. Referencing FIGS. 2 and 3, one way of introducing such a non-zero elevation angle α is to have a vertical curve region 120 in railroad track 100. As is known in the art of highway and railroad construction, a "vertical curve" is a geometric shaping of a roadway region joining two sloping roadway sections in a way that allows a vehicle to gradually negotiate the change between the two sloping roadway sections. In the present invention, vertical curve region 120 cancels the effects experienced by a railcar as a result of the angular change between axes 110 to 210 occurring in transition region 10. It is to be understood that non-zero elevation angle α can be created by rails 102/104, guideway housings 202/204, or a combination thereof without departing from the scope of the present invention.

In general, non-zero elevation angle α provides for the transition between complete railroad-track vehicle support along railroad track 100 and complete maglev-guideway vehicle support along maglev guideway 200. As will be explained further below, vehicle support is shared by the portions of the railroad track and maglev guideway in transition system 10. The value of non-zero elevation angle α is selected to define a gentle grade on the order of 0.1-0.3 percent between the railroad track and maglev guideway in transition system 10. The actual value will vary with factors such as length of transition system 10, construction of the bi-modal bogies that are to travel through transition system 10, the weight and/or length of the vehicles that are to travel through transition system 10, etc.

Figure 5:
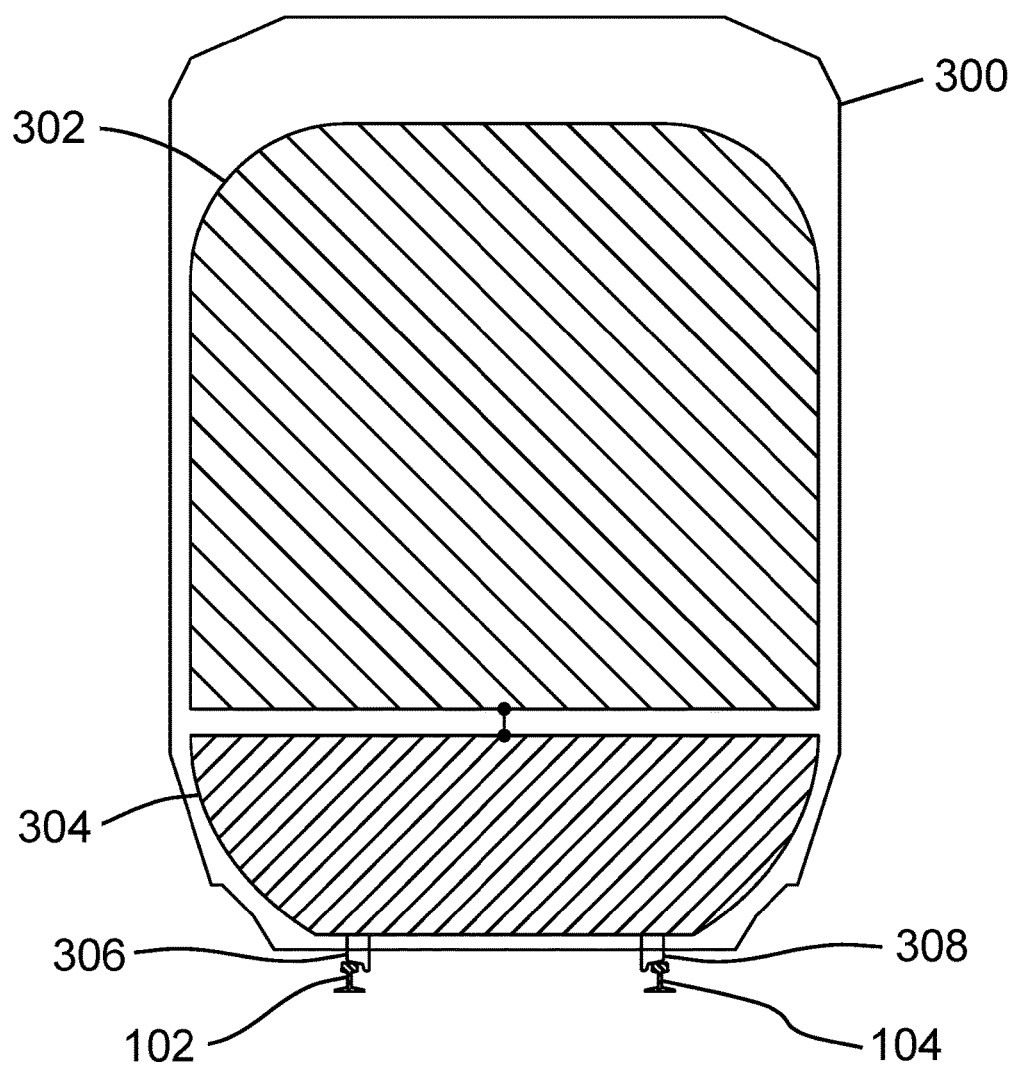
FIG. 5 is a schematic view of a railroad loading gauge illustrating a cross-sectional region available for conventional railroad track trucks and maglev components.

A bimodal vehicle capable of operating on railroad track 100 and of operating with conventional railroad infrastructure more generally needs to satisfy numerous constraints governing rail vehicles. One of the most important of these is the loading gauge, a clearance standard that applies to vehicles on a given rail line. FIG. 5 shows a standard North American passenger loading gauge 300 located relative to rails 102 and 104. The vehicle cross section of the vehicle body, shown schematically as 304, and cross section of the supportive bimodal truck/bogie, shown schematically as 304, must both fit into the polygonal region 300 of the loading gauge. Only the truck/bogie wheels 306 and 308 can pass outside the perimeter defined by the loading gauge. A rail vehicle satisfying the loading gauge is guaranteed to clear switch stands, tunnels, track-side signals, loading platforms, and other railroad infrastructure.

Figure 6:
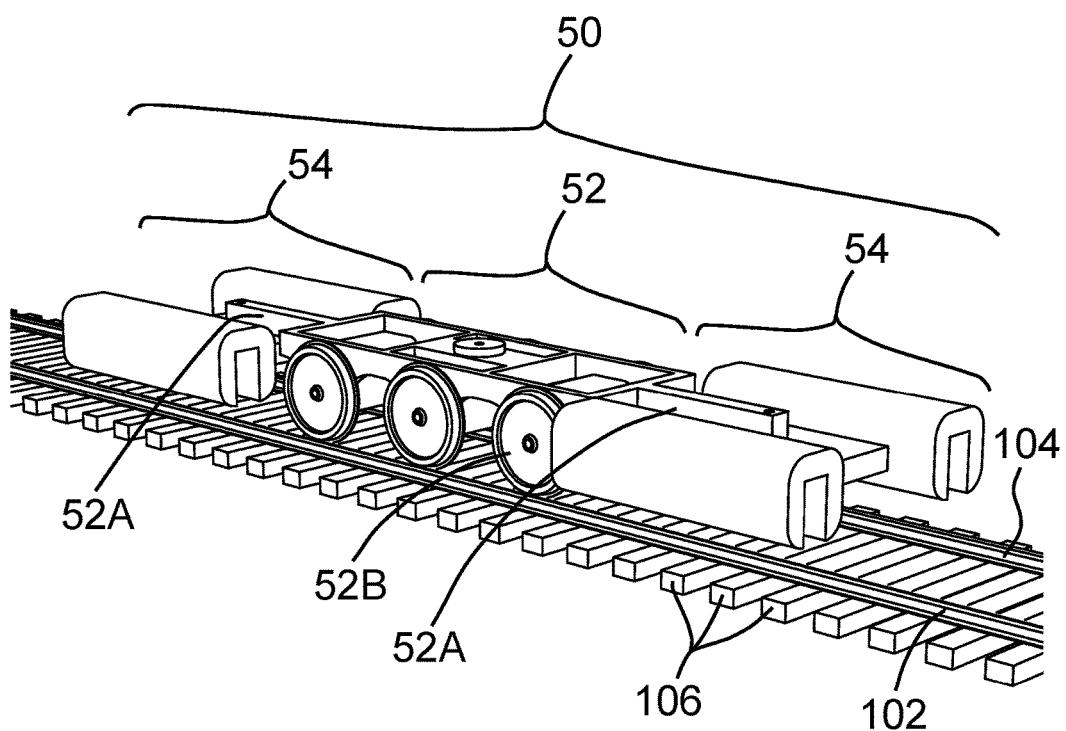
FIG. 6 is a perspective view of a bimodal bogie fully-supported on a conventional railroad track.
Figure 7:
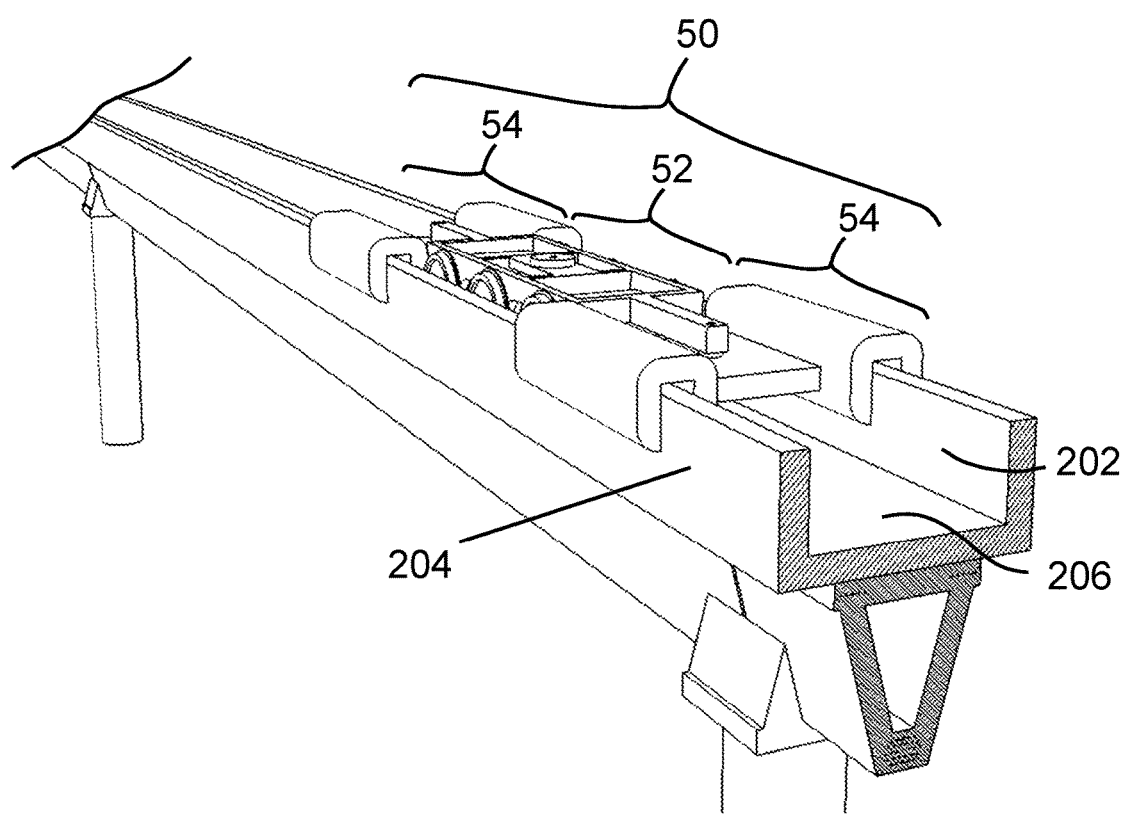
FIG. 7 is a perspective view of a bimodal bogie fully-supported on a two-rail maglev guideway.

By way of an illustrative example, a bimodal bogie for travel along railroad track 100, maglev guideway 200, and transition system 10 is shown in FIGS. 6 and 7 and is referenced generally by numeral 50. For clarity of illustration, only the rail and guideway engaging components of bimodal bogie 50 are illustrated. One or more of bimodal bogie 50 will support a load (not shown) as would be well understood in the art. Bimodal bogie 50 includes a conventional powered truck 52 for riding on/along rails 102/104 of conventional railroad truck 100 as shown in FIG. 6. Supported by frame extensions 52A of truck 52 at each longitudinal end of powered truck 52 is a maglev truck 54 that includes components for interactions with components in guideway housings 202/204 as shown in FIG. 7. Since powered truck 52 must be suspended in air when bimodal bogie 50 travels along maglev guideway 200, the "sandwiching" of powered truck 52 by maglev trucks 54 provides a balanced support/lifting of powered truck 52 when bimodal bogie 50 is traveling along maglev guideway 200 (FIG. 7).

Figure 8:
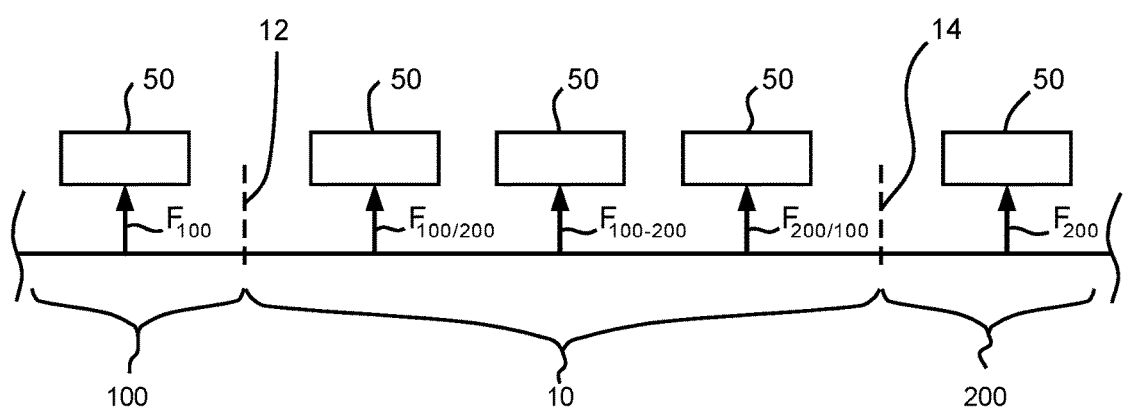
FIG. 8 is a diagram illustrating load support of a bimodal vehicle on a conventional railroad track, a transition region, and a maglev guideway in accordance with the present invention.

In accordance with the present invention, transition system 10 provides for the shared support of a bimodal bogie/vehicle traveling between railroad track 100 and maglev guideway 200. This shared support is illustrated via a load diagram shown in FIG. 8 where bimodal bogie 50 is shown at various places along railroad truck 100, transition system 10, and maglev guideway 200. Along railroad track 100, bimodal bogie 50 is fully supported by railroad track 100 as indicated by force arrow $F_{100}$. Along maglev guideway 200, bimodal bogie 50 is fully supported by maglev guideway 200 as indicated by force arrow $F_{200}$. Along transition system 10, bimodal bogie 50 is (i) primarily supported near end 12 by the transition system's contiguous portion of the railroad track as indicated by force arrow $F_{100/200}$, (ii) primarily supported near end 14 by the transition system's contiguous portion of the maglev guideway as indicated by force arrow $F_{200/100}$, and (iii) supported approximately evenly by the transition system's contiguous portions of the railroad track and maglev guideway at central region of transition system 10 as indicated by force arrow $F_{100\text{-}200}$.

The load transfer operating principle of transition system 10 is simple but there are several subtleties. First, the linear motors in the maglev trucks and the wheels in the powered trucks need to be set to propel the vehicle at exactly the same speed. Otherwise, there would be an abrupt acceleration or deceleration during transition causing potential derailment. Such speed control is well understood in the art and is, therefore, not a limitation of the present invention.

Second, the powered truck and maglev trucks comprising each bimodal bogie need to be aligned as the bogie enters the transition region. There is no issue in the transition from maglev to rail since the power truck, functioning as a span bolster, is held in rigid alignment by the maglev trucks. However, this is not the case in the reverse transition from rail to maglev guideway. Operating on rail, the maglev trucks play no role and can freely rotate. If they accidentally twist out of alignment they would collide with the guideway rails as the vehicle enters the transition region. To prevent this, a system of centering springs or pneumatic pistons (not shown) can be provided on the bimodal bogie to force the maglev trucks to remain in correct alignment while the bimodal bogie is operating on conventional track. This is simple engineering well understood in the art and is, therefore, not illustrated in the figures.

Figure 9:
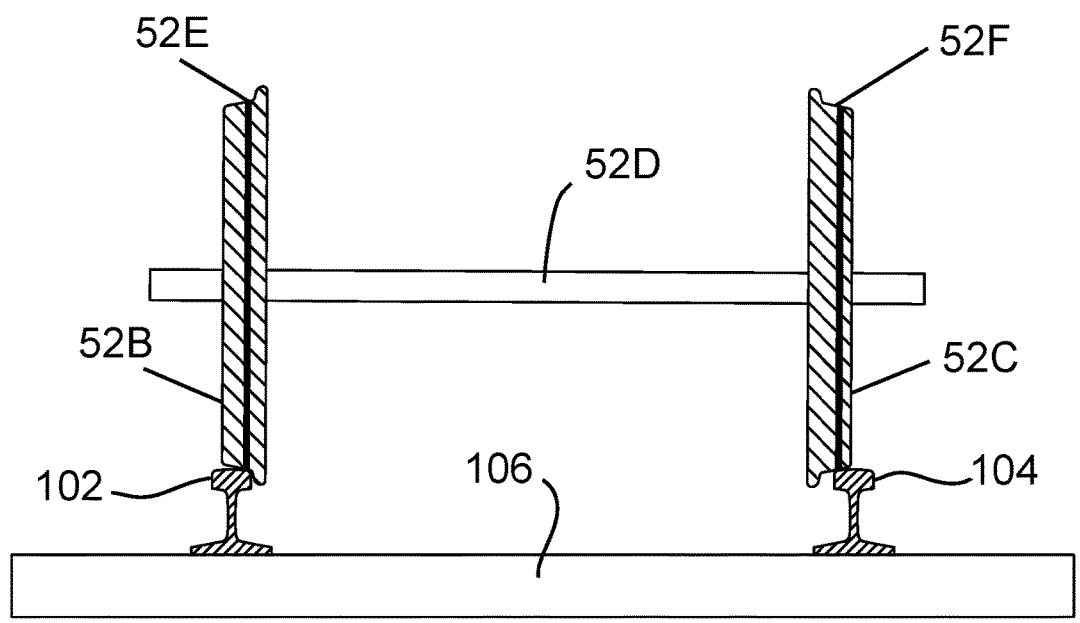
FIG. 9 is a diagrammatic view of a conventional railroad vehicle wheelset following a convention railroad track's rails in accordance with the process known as coning.

A third issue arising in the transition from maglev to conventional rail is that the train wheels in the powered truck must follow the track correctly at the moment when the wheels first contact the track. Similarly, in the transition from rail to maglev, the powered truck's wheels must follow the track correctly as the maglev system lifts the powered truck off the rails. As is well-known in the railroad art, train wheels follow railroad tracks through a process known as "coning." The wheel flanges guide the wheels through turnouts and prevent derailment on sharp curves, but the coning process guides the wheels almost all of the time with the flanges functioning primarily as a backup system. Referring now to FIG. 9, the process of coning will be explained. Train wheels for a conventional powered truck 52 are constructed as "wheel sets" consisting of a left and right wheel 52B and 52C connected by a common axle 52D. If a wheelset is shifted a bit to the left as shown in FIG. 9, the circle of contact 52E of the left wheel 52B will be larger than the circle of contact 52F of the right wheel 52C. Since the left and right wheels are connected by common axle 52D, they rotate at the same rate. The larger radius circle of contact 52E of left wheel 52B implies that the left wheel will travel faster, and the wheelset will tend to turn to the right causing the truck to center.

Coning only works when both left and right wheels in each wheelset have good contact with the rails. The problem in the present invention is that, as the bimodal bogie transitions from maglev to conventional rail, the wheels on one side of the powered truck will typically touch down before the wheels on the other side of the powered truck since there is no reason to expect the bimodal bogie to be absolutely level. Similarly, as the bimodal bogie transitions from conventional rail to maglev, the wheels on one side will typically lift off before those on the other side. In either case coning will not work, and the conical surface of the wheels will create an unbalanced lateral force.

The maglev trucks tend to provide lateral stability throughout transition system 10. However, transition would be much smoother and there would be less wear and tear if coning were effective at the point where the conventional railroad wheels in the powered trucks contact or lift off the railroad track rails. To address the above-described issue, the present invention can include a support structure for the contiguous portion of the railroad track in transition system 10. By way of illustrative examples, two such support structures are shown in FIGS. 10 and 11.

Figure 10:
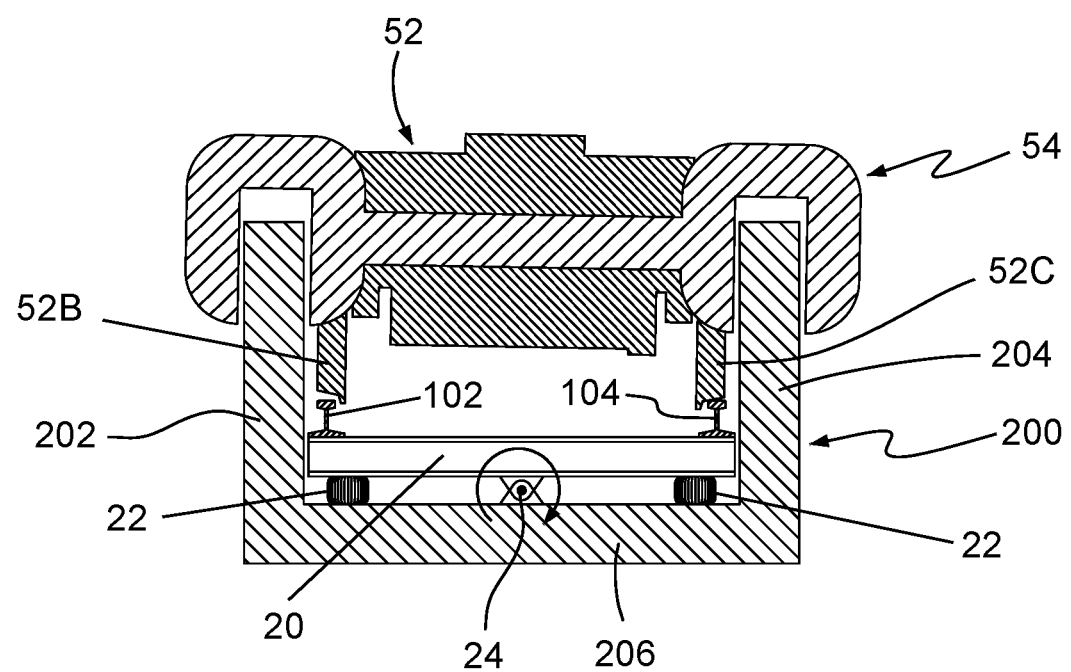
FIG. 10 is a cross-sectional view of a transition region to include a support structure for equalizing the load due to a bimodal vehicle passing through the transition region in accordance with an embodiment of the present invention.

Referring first to FIG. 10, a "teeter-totter" type of support structure is provided between base 206 of the transition system's contiguous portion of maglev guideway 200 and rails 102/104 of the transition system's contiguous portion of railroad track 100. The support structure includes one or more beams 20 distributed along some or all of the transition system under rails 102/104 where beams 20 are analogous to railroad track ties. Compressive pads 22 are provided near the ends of each beam 20 between each beam 20 and base 206. Each beam 20 is centrally supported by a pivot support 24 that allows beam 20 to pivot about support 24 predicated on a load differential applied to rails 102 and 104. In this way, each beam 20 can tilt to equalize the vertical force of wheels 52B/52C thereby ensuring that coning will be effective at the point along the transition system where wheels 52B/52C first contact (or lift off) rails 102/104.

Figure 11:
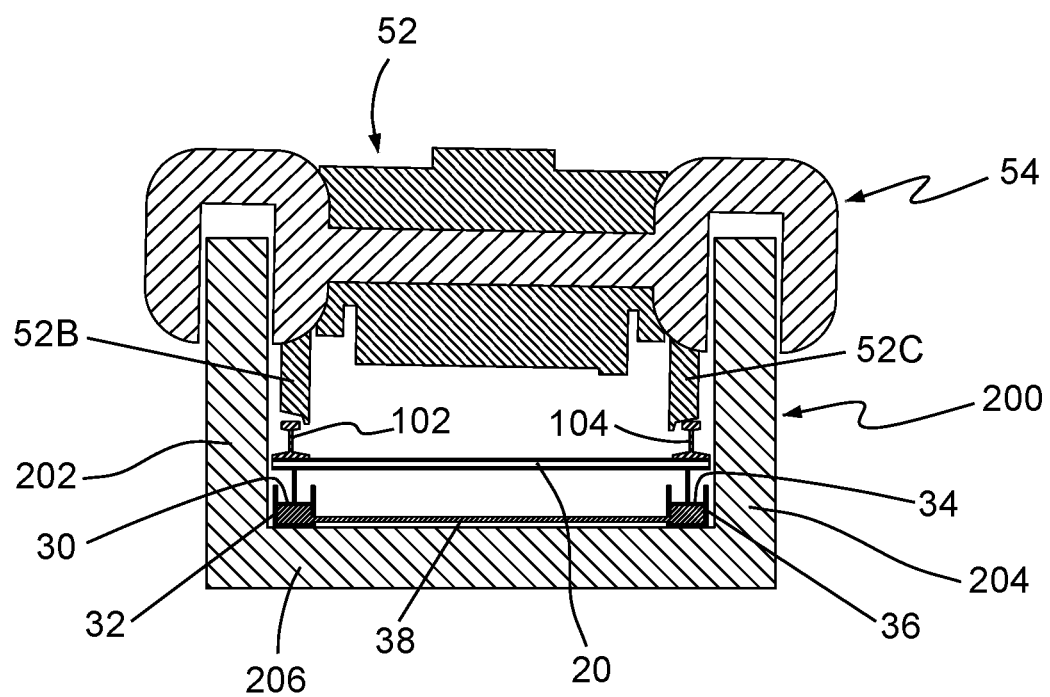
FIG. 11 is a cross-sectional view of a transition region to include a support structure for equalizing the load due to a bimodal vehicle passing through the transition region in accordance with another embodiment of the present invention.

Referring now to FIG. 11, another embodiment of a support structure is illustrated. Briefly, each beam 20 is supported by spaced-apart and fluid-coupled hydraulic pistons to engage and react to a tilting beam 20 in a similar fashion as described above. More specifically, a first piston 30 is disposed in a fluid-filled cylinder 32 near one end of beam 20. A second piston 34 is disposed in a fluid-filled cylinder 36 near the other end of beam 20. Fluid-filled cylinders 32 and 36 are in fluid communication with one another via a fluid-filled conduit 38. In this way, when one piston is pushed downward by the force of a wheel on its corresponding rail (e.g., wheel 52C on rail 104 as shown in FIG. 11), the other piston is pushed upward as fluid is displaced between the fluid-filled cylinders.

The advantages of the present invention are numerous. The transition system provides a seamless interoperability link between a conventional railroad track and a maglev guideway. The transition system can be constructed to fit within a conventional railroad's loading gauge thereby allowing conventional railway vehicles to be adapted for transition to and operation on maglev guideways. The transition system opens the possibility of linking high-speed long-distance maglev transportation with low-speed local railroad track transportation to thereby facilitate high-speed urban-to-urban ground transportation.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A bi-directional railroad-track to maglev-guideway transition system, comprising:
    a portion of a railroad track having two parallel rails defining a first axis of travel;
    a portion of a maglev guideway defining a second axis of travel, said portion of said maglev guideway being adjacent to said two parallel rails of said portion of said railroad track, wherein a non-zero elevation grade is defined between said first axis of travel and said second axis of travel; and
    a support structure coupled to said portion of said railroad track for seesaw adjustment of a height of each of said two parallel rails based on a differential load applied to said two parallel rails.

2. A bi-directional railroad-track to maglev-guideway transition system as in claim 1, wherein said support structure comprises:
    at least one rigid beam spanning between and supporting said two parallel rails of said portion of said railroad track;
    a pivot support coupled to a central region of each said beam;

a first elastically-deformable member disposed beneath each said beam and aligned with a first of said two parallel rails; and a second elastically-deformable member disposed beneath each said beam and aligned with a second of said two parallel rails.

3. A bi-directional railroad-track to maglev-guideway transition system as in claim 1, wherein said support structure comprises:

at least one rigid beam spanning between said two parallel rails of said portion of said railroad track; and hydraulically-coupled pistons spaced apart from one another and disposed beneath each said beam for supporting said two parallel rails of said portion of said railroad track.

4. A bi-directional railroad-track to maglev-guideway transition system as in claim 3, wherein said hydraulically-coupled pistons comprise:

a first piston disposed in a first fluid-filled cylinder;

a second piston disposed in a second fluid-filled cylinder; and a fluid-filled conduit in fluid communication with said first fluid-filled cylinder and said second fluid-filled cylinder.

5. A bi-directional railroad-track to maglev-guideway transition system, comprising:

a portion of a railroad track having two parallel rails defining a first axis of travel;

a portion of a maglev guideway defining a second axis of travel, said portion of said maglev guideway having a base disposed beneath said portion of said railroad track and having operational components disposed in a pair of guideway housings coupled to said base and spaced apart by a distance greater than a distance between said two parallel rails, wherein a non-zero elevation grade is defined between said first axis of travel and said second axis of travel; and a support structure disposed between said base and said portion of said railroad track for seesaw adjustment of a height of each of said two parallel rails based on a differential load applied to said two parallel rails.

6. A bi-directional railroad-track to maglev-guideway transition system as in claim 5, wherein said support structure comprises:

at least one rigid beam spanning between and supporting said two parallel rails of said portion of said railroad track;

a pivot support coupled to a central region of each said beam;

a first elastically-deformable member disposed beneath each said beam and aligned with a first of said two parallel rails; and a second elastically-deformable member disposed beneath each said beam and aligned with a second of said two parallel rails.

7. A bi-directional railroad-track to maglev-guideway transition system as in claim 5, wherein said support structure comprises:

at least one rigid beam spanning between and supporting said two parallel rails of said portion of said railroad track; and hydraulically-coupled pistons spaced apart from one another and disposed beneath each said beam.

8. A bi-directional railroad-track to maglev-guideway transition system as in claim 7, wherein said hydraulically-coupled pistons comprise:

a first piston disposed in a first fluid-filled cylinder;

a second piston disposed in a second fluid-filled cylinder; and a fluid-filled conduit in fluid communication with said first fluid-filled cylinder and said second fluid-filled cylinder.

9. A bi-directional railroad-track to maglev-guideway transition system, comprising:

a railroad track ending at a first point, said railroad track having two parallel rails;

a maglev guideway ending at second point;

a transition railroad track having two parallel rails contiguous with said two parallel rails of said railroad track, said transition railroad track extending from said first point to said second point;

a transition maglev guideway contiguous with said maglev guideway and adjacent to said two parallel rails of said transition railroad track, said transition railroad track extending from said second point to said first point, wherein a non-zero elevation grade is defined between said transition railroad track and said transition maglev guideway, said non-zero elevation grade adapted to distribute support of a bimodal vehicle traveling between said first point and said second point, wherein the bimodal vehicle is totally supported by said transition railroad track at said first point, wherein the bimodal vehicle is totally supported by said transition maglev guideway at said second point, and wherein the bimodal vehicle is supported by said transition railroad track and said transition maglev guideway between said first point and said second point; and a support structure coupled to said transition railroad track for seesaw adjustment of a height of each of said two parallel rails of said transition railroad track based on a differential load applied by the bimodal vehicle to said two parallel rails along said transition railroad track.

10. A bi-directional railroad-track to maglev-guideway transition system as in claim 9, wherein said support structure comprises:

at least one rigid beam spanning between and supporting said two parallel rails of said transition railroad track;

a pivot support coupled to a central region of each said beam;

a first elastically-deformable member disposed beneath each said beam and aligned with a first of said two parallel rails of said transition railroad track; and a second elastically-deformable member disposed beneath each said beam and aligned with a second of said two parallel rails of said transition railroad track.

11. A bi-directional railroad-track to maglev-guideway transition system as in claim 9, wherein said support structure comprises:

at least one rigid beam spanning between and supporting said two parallel rails of said transition railroad track; and hydraulically-coupled pistons spaced apart from one another and disposed beneath each said beam.

12. A bi-directional railroad-track to maglev-guideway transition system as in claim 11, wherein said hydraulically-coupled pistons comprise:

a first piston disposed in a first fluid-filled cylinder;

a second piston disposed in a second fluid-filled cylinder; and a fluid-filled conduit in fluid communication with said first fluid-filled cylinder and said second fluid-filled cylinder.

\* \* \* \* \*